United States Patent
Rossi et al.

(10) Patent No.: US 6,592,265 B1
(45) Date of Patent: Jul. 15, 2003

(54) BEARING FOR ROLLING STANDS WITH CROSSING ROLLS

(75) Inventors: Antonino Rossi, Cassina de Pecchi (IT); Cesare Maiandi, Milan (IT)

(73) Assignee: SMS Demag Innse SpA, Milan (IT)

( * ) Notice: Subject to any disclaimer, the term of this patent is extended or adjusted under 35 U.S.C. 154(b) by 0 days.

(21) Appl. No.: 09/674,108
(22) PCT Filed: Apr. 8, 1999
(86) PCT No.: PCT/EP99/02492
§ 371 (c)(1),
(2), (4) Date: Dec. 12, 2000
(87) PCT Pub. No.: WO99/56895
PCT Pub. Date: Nov. 11, 1999

(30) Foreign Application Priority Data

Apr. 30, 1998 (IT) .......................................... MI98A0932

(51) Int. Cl.[7] .............................................. F16C 19/30
(52) U.S. Cl. ........................................ 384/619; 384/620
(58) Field of Search ................................. 384/620, 618, 384/621, 622, 623, 613, 619; 100/158 R; 425/366; 77/237, 241.8, 248, 245

(56) References Cited

U.S. PATENT DOCUMENTS

| | | | |
|---|---|---|---|
| 3,199,329 A | * | 8/1965 | Toth ............................ 384/620 |
| 4,348,952 A | | 9/1982 | Gooch |
| 4,453,393 A | | 6/1984 | Hino et al. |
| 5,320,434 A | | 6/1994 | Fujihara et al. |
| 5,984,529 A | * | 11/1999 | Drigani et al. .............. 384/619 |

FOREIGN PATENT DOCUMENTS

| | | |
|---|---|---|
| EP | 0 815 965 | 1/1998 |
| EP | 0 893 169 | 1/1999 |
| JP | 4-55004 | 2/1992 |
| JP | 4-361802 | 12/1992 |
| JP | 5-87128 | 4/1993 |

OTHER PUBLICATIONS

Shunji Kamada et al.: "Edge Profile Control Using Pair Cross Mill in Cold Rolling" Iron and Steel Engineer, vol. 73, No. 6, Jun. 1, 1996, pp. 20–26, XP000621621 ISSN: 0021-1559 p. 22; figure 4

* cited by examiner

Primary Examiner—Thomas R. Hannon
(74) Attorney, Agent, or Firm—Katten Muchin Zavis Rosenman

(57) ABSTRACT

The invention relates generally to rolling stands (1) for strips and the like, of the type with crossing rolls (10, 11, 12, 13). More specifically, the invention relates to a special bearing (30) which allows the angular adjustment of the crossing rolls (10–13) even under load, that is to say, during rolling. The bearing (30) is interposed between the parts which in the course of the angular adjustment, move relative to one another and onto which the rolling forces are transmitted. According to a preferred embodiment, the bearing of the invention is formed by two rolling-contact thrust bearings superposed eccentrically one above the other.

12 Claims, 6 Drawing Sheets

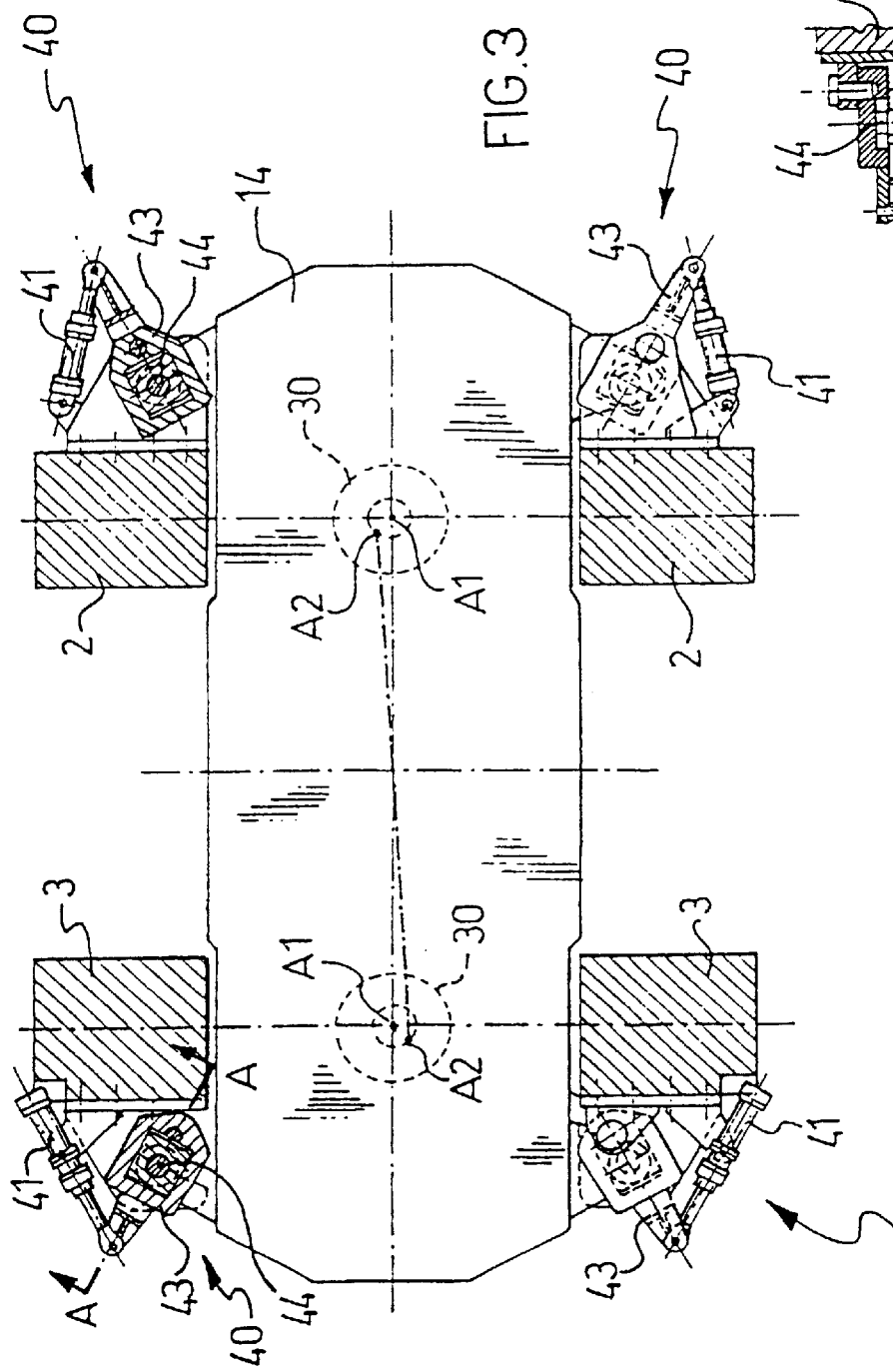
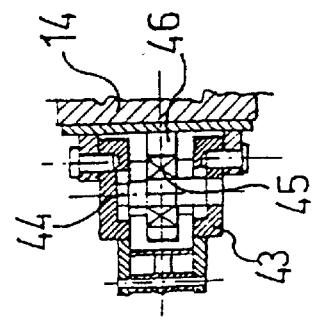
FIG.3
FIG.3a

BEARING FOR ROLLING STANDS WITH CROSSING ROLLS

The present invention belongs to the field of rolling of flat products, such as plates, slabs, strips and the like, carried out using crossing rolls.

As is known, this particular type of rolling is carried out with rolling mills wherein the various stands forming them are provided with a pair of opposed working rolls, between which the material to be rolled advances and which act respectively on the upper and on the lower face of the material.

The axes of rotation of the working rolls are not parallel as in conventional rolling mills built have an arrangement which, in plan view, has a "X" configuration which is precisely the origin of the naming "with crossing rolls" which distinguishes that type of rolling and the associated rolling mills.

The technical reasons underlying the special arrangement of the rolls just mentioned, have been widely explained in several scientific publications and patents concerning this subject; reference should therefore be made to those documents for further clarification while it will merely be added here that, internationally, the crosswise arrangement of the rolls is indicated by the adjective "crossing" which will also be used in the course of this description.

It should also be pointed out that, in view of the substantial forces occurring during the rolling process (of the order of $2 \times 10^3 - 4 \times 10^3$ tonnes), in order to prevent the working rolls from bending, it is known to stiffen them structurally by purposely using backup rolls.

Usually there are two backup rolls, respectively coupled to the working rolls in such a manner as to roll on their outer surfaces along a contact generatrix which is located on the side opposite to that acting on the material to be rolled; such a layout of the rolls is also known by the expression "pair crossing".

It should however be specified that it is not necessary for the backup rolls to be in contact with the working rolls along a common generatrix; likewise, it should also be pointed out that examples of rolling mills are known where two or more backup rolls are associated with the working rolls of each stand. As can be appreciated there are thus numerous variants resulting from the different combinations which can be constructed on the basis of the teaching of rolling with crossing rolls; reference will be made to them hereinafter and in the appended claims, although for the sake of simplicity and clarity, consideration will be given mainly to the pair crossing rolling.

Within the framework of the search for novel technical solutions in order to obtain rolling mills having ever higher performances, substantial importance is currently attached to the adjustment under load of the angular position of the working rolls, that is to say, of the inclination of their axes with respect to the direction of the of advance of the material being worked or to a direction transverse thereto, either horizontal or vertical.

The adjustment takes place during rolling (i.e. when the rolls are under load) and is particularly suitable for continuous rolling mills, also known as endless rolling mills, the demand for which is currently growing.

An example of rolling stand so designed that the inclination of the rolls can be adjusted, is known from U.S. Pat. No. 4,453,393 of 12/06/1984 in the name of Mitsubishi.

This document discloses a rolling stand of the pair crossing type, that is to say a stand having two working rolls each having a backup roll associated thereto; each pair of rolls is mounted in a suitable support housing which is accommodated in a load-bearing structure of the stand formed by two opposed frames, in such a manner as to be orientatable relative to a vertical axis.

The inclination of the rolls is adjusted by causing the associated housing to rotate about the above-mentioned vertical axis, with thrust members located on the uprights of the load-bearing structure of the stand. Such a rolling stand is not, however, suitable for effecting adjustment during rolling, that is to say when the rolls are under load. It should indeed be borne in mind that when the working rolls roll the material, they must be maintained at a predetermined distance; in other words, in addition to the inclination, it is also necessary during rolling to check the interaxial spacing of the working rolls (because the thickness of the material being worked depends on it).

The rolling stand described in the above-mentioned US patent is therefore provided with two actuators which are incorporated in the upper portion of the frames of the structure and act along two parallel vertical straight lines passing through the support chocks of the rolls.

However it should be noted that during rolling, because of the strong stresses which are transmitted from the bearings of the rolls to the actuators, the frictions between the actuators and the surfaces on which they act are highly relevant and therefore the rotation of the housings necessary for adjusting the inclination of the rolls is not easily made.

For this reason in recent times a special axial thrust bearing has been developed, which forms the subject-matter of another U.S. Pat. No. 5,320,434 of 14/06/1994, the proprietor thereof is the Japanese company NSK.

This bearing is of the rolling-contact type and is interposed between the above-mentioned actuators and the surfaces against which they act, that may be located in various positions depending on the different possible configurations of the rolling stands, as will be seen more clearly hereinafter.

In practice, the bearing in question is formed by a series of rolling bodies (cylindrical rolls or balls) arranged side by side along arcs of circles which are concentric with to the vertical axis about which the working rolls of the stand are caused to rotate, in order to adjust their angular position.

To be more precise, the rolling bodies are accommodated in respective compartments formed inside a kind of stand which is movable along a seat present in a base plate; furthermore, each stand is subject to the resilient force of some springs which return it to a neutral centred position with reference to the bearing.

As will be appreciated from this brief and incomplete explanation, the bearing known from the second US patent is certainly not the simple from the structural point of view and therefore also its industrial manufacturing must be seemingly difficult, since it is not a standard thrust bearing of the commercially available type.

It should also be borne in mind that the mounting of these bearings has to be very accurate because otherwise, if they are not positioned precisely, the arcs of circle along which the rolling bodies are arranged would no longer be concentric with the vertical axis about which the rotation of the crossing rolls takes place. It may be inferred that an incorrect distance between the bearings and the vertical axis would cause slipping between the rolling bodies and the surfaces in contact therewith, which would give rise to problematic functioning of the bearings.

This last aspect also involves the important drawback that variations in the length of the crossing rolls of the stand, render necessary to change the axial bearings in order to keep the centre of their arcs located correctly along the vertical axis about which the angular adjustment of the rolls takes place.

In other words, this fact means that only one rolling stand having predetermined dimensions (of the crossing rolls) corresponds to a specific type of bearing according to the NSK patent, so that, from the point of view of industrial costs, such a situation is certainly not the most advantageous since it is clear that the economies of scale obtainable with standard series of bearings are certainly not attainable.

In view of the above it will be appreciated that a need is felt for a bearing for rolling stands having crossing rolls, with structural and functional features such as to overcome the disadvantages associated with the prior art above and in particular with the thrust bearing of U.S. Pat. No. 5,320,434.

This object of the present invention is to provide a bearing that fulfills such a need.

This object is achieved by a bearing whose features are set forth in the claims appended to this description.

The invention as a whole will be better understood on the basis of the following detailed description relating to one of its preferred, non-exclusive embodiments, illustrated in the annexed drawings in which:

FIG. 3 is a sectional view of the rolling stand taken along line III—III of FIG. 2;

FIG. 3a is a sectional view along the line A—A of FIG. 3;

Figure 1:
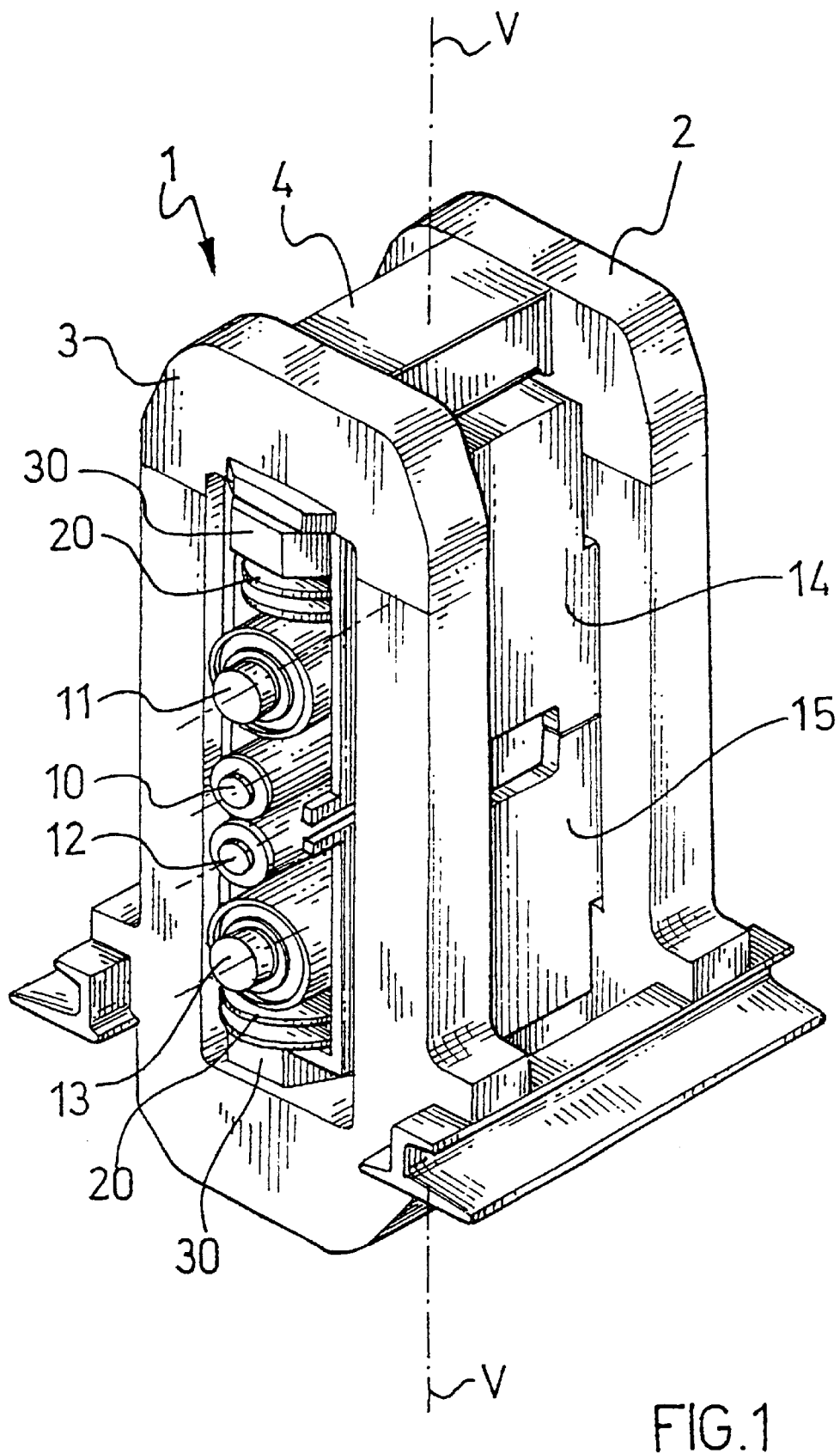
FIG. 1 is a perspective view, with some parts removed, of a rolling stand according to the invention.
Figure 2:
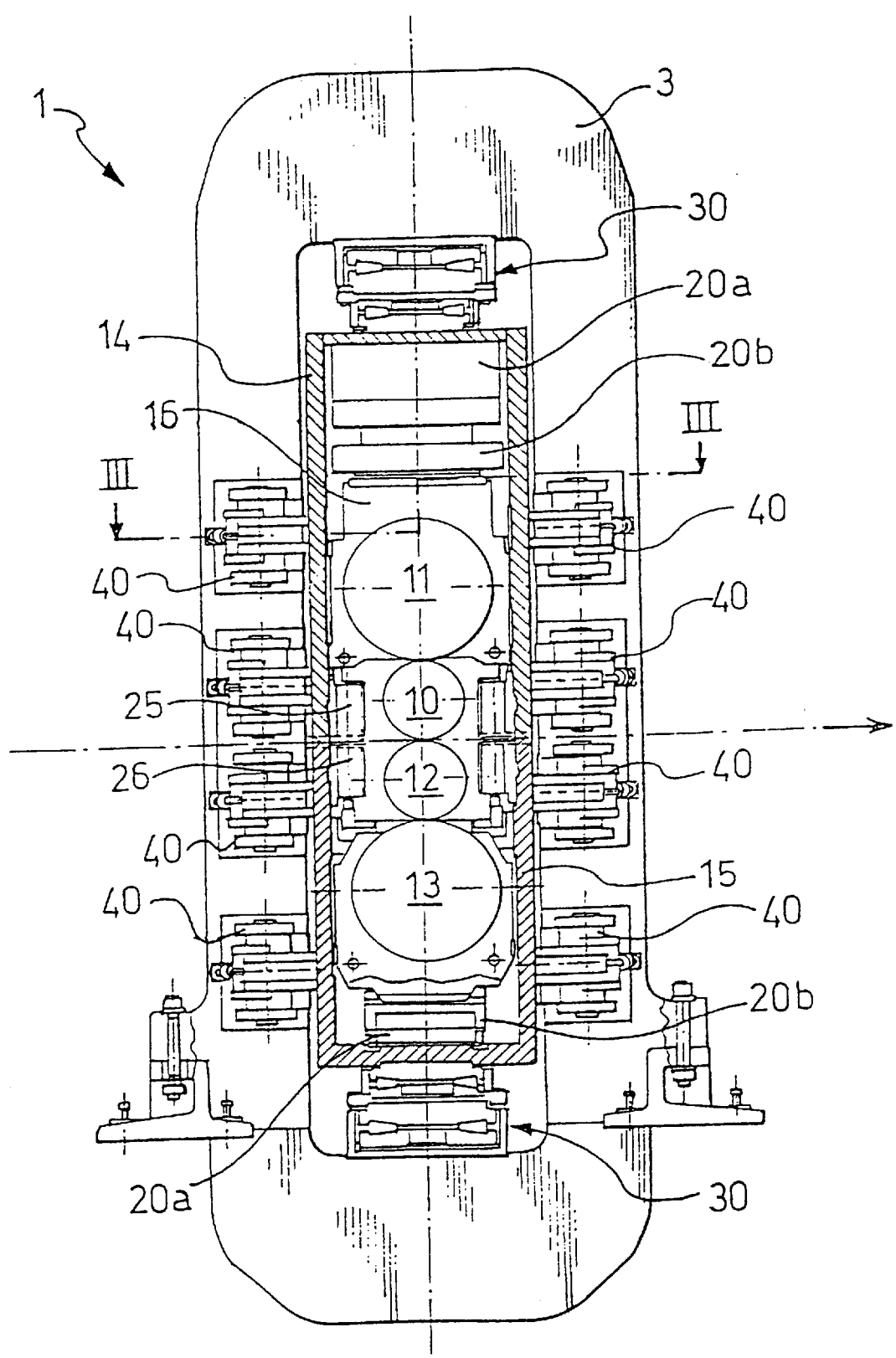
FIG. 2 is a partially sectional front view of the rolling stand of FIG. 1.

Referring to the drawings above mentioned, a rolling stand having crossing rolls is generally indicated 1 therein. The stand comprises an external load-bearing structure formed by two lateral shoulders or frames 2 and 3, rigidly connected at the top by a cross-member 4 and secured at the bottom to a base which is not numbered in the Figures.

As shown in the drawings stand 1 is of the pair crossing type, that is to say, it is provided with two pairs of rolls, each formed by a working roll 10, 12 and a backup roll 11, 13 and are arranged, respectively, above and below the material to be rolled.

More especially, the pairs of rolls 10, 11 and 12, 13 are accommodated in respective homologous housings 14, 15 which are held in the load-bearing structure of the stand, in such a manner that they can be orientated relative to a vertical axis V passing through the point of intersection, in plan view, of the axes of rotation of the crossing rolls; as will be seen more clearly hereinafter, the vertical axis V is not fixed relative to the structure of the stand but can be moved slightly as a function of the adjustment of the inclination of the rolls.

In order to adjust the distance between, or the interaxial spacing of, the working rolls 10 and 12, there are also arranged on each housing 14, 15 two actuators 20 located vertically along straight lines passing through the chocks 16 of the bearing rolls 11, 13, that operate on said chocks.

The actuators comprise a fixed portion 20a which is unitary with the housing and is coupled to a movable portion 20b that slides to and fro relative to the fixed portion, along the above-mentioned straight line of vertical action; the actuators 20 may be of the electromechanical type (the so-called "screw"), which is not the one shown in the appended drawings, or of the hydraulic type (the so-called "capsule") and are per se similar to those already existing in the prior art.

However, unlike what is disclosed in the U.S. Pat. No. 4,453,393 to Mitsubishi considered above in the present case, the actuators are mounted on the roll-carrying housing (that is to say, not on the load-bearing structure of the stand); furthermnore, their fixed portion 20a is pushed, during rolling, together with the associated housing, against the frames 2, 3 of said structure: interposed between each housing 14, 15 and the frames 2, 3 there are the bearings 30 of the present invention which will be discussed more extensively hereinafter.

As shown in the Figures, the housings 14 and 15 are arranged one at the top and one at the bottom of the rolling stand and are formed by two opposed walls lying transversely to the feeding direction of the material to be rolled, which are connected to one another on the side where the actuators 20 are.

Naturally, the housings 14, 15 are open toward the part where the working rolls 10 and 12 are located, so that the rolling operation can be carried out, but they must also be accessible from the exterior sidewise the stand in order to enable the working rolls to be connected to a corresponding drive shaft (not shown), and also for enabling to remove them by pulling out axially in a position opposite to that of the drive shaft.

Finally, the housings 14, 15 also accommodate devices 25, 26 for bending and supporting the working rolls 10, 12; these devices, which are known per se, are hydraulic jacks that act on the chocks of the working rolls and urge the working rolls against the respective backup rolls 11 and 13, thereby maintaining them in contact with one another, preflexing said working rolls.

Further to what was stated above, detailed consideration will now be given to the structure of the bearings 30 of the invention; it just matters to be said that for sake of brevity of description, reference will be made here to the housing 14 and to the associated bearings 30, but what will be explained should be understood as applying, mutatis mutandis, also to the housing 15 and the other bearings 30.

Figure 4:
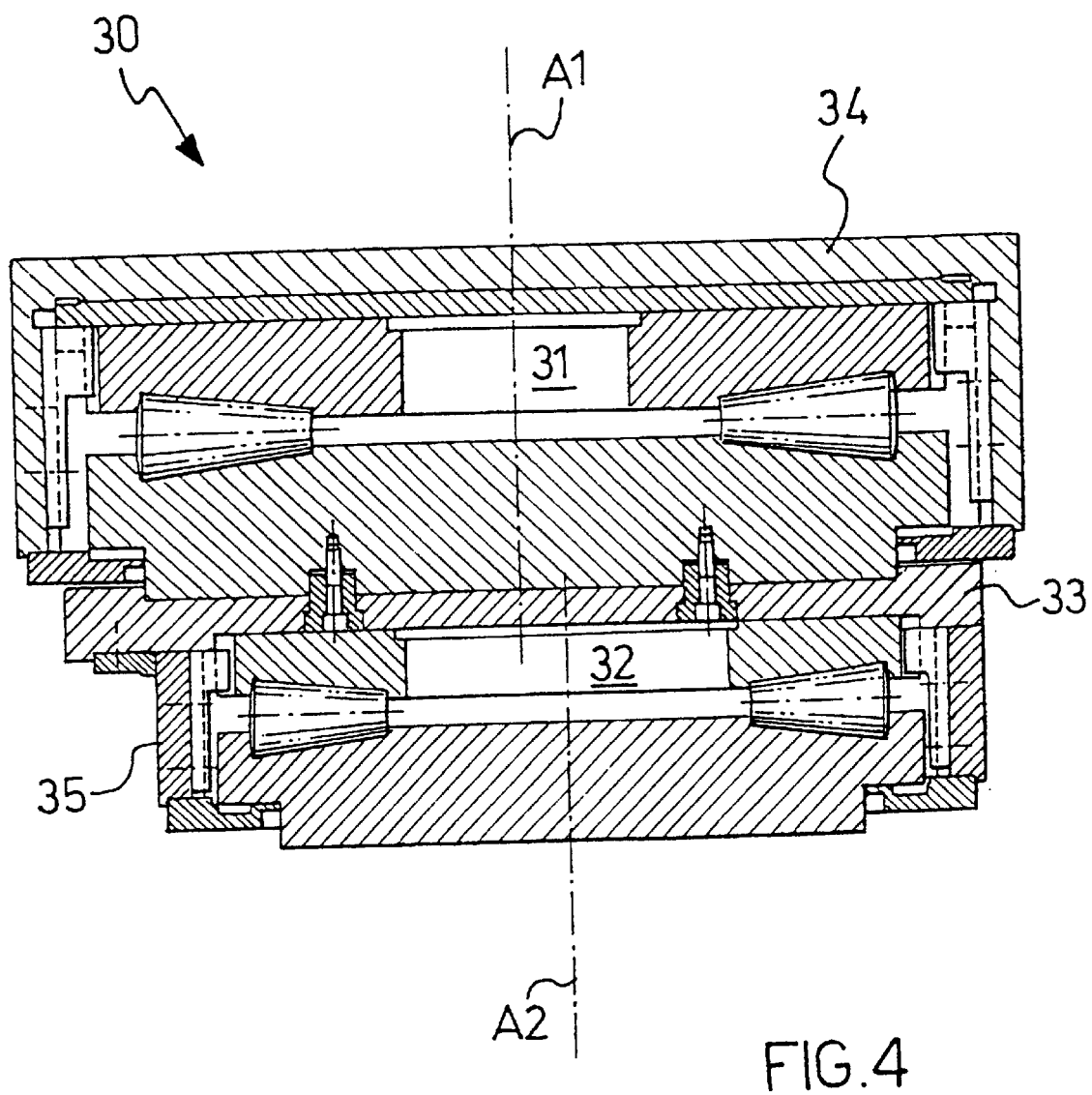
FIG. 4 is a detailed section through one of the bearings according to the invention.

As shown in FIG. 4, each bearing 30 is in its turn formed by two thrust rolling-contact bearings 31, 32 which have conical rolls and are designed as normal thrust bearings arranged one above the other.

To be more precise, the upper thrust bearing 31, having associated axis A1, is accommodated inside a casing 34 secured at the top to the frames 2, 3 of the structure of the stand and is mounted at the bottom on a support 33 (for example by means of bolts which penetrate into the bearing block, as shown in FIG. 4); the lower-thrust bearing 32, having its associated axis A2 which is eccentric relative to the axis A1, is accommodated in a second casing 35 secured at the top (for example by means of bolts as shown in FIG. 4) to the support 33, and is mounted at the bottom on the housing 14.

Finally, the rolling stand 1 is also provided with a plurality of thrust members 40 for changing the angular position of the housings 14, 15 and therefore, together with the housings, also the position of the rolls 10–13, with respect to the vertical reference axis V.

The thrust members (see FIG. 3) comprise a hydraulic cylinder having one end hinged to the frames 2, 3 of the stand and the other one connected to a crank 43 which is in turn hinged to the housing 14 (or 15 as the case may be); the crank 43 also supports a pin 44 on which a small wheel 45 is mounted idly. The small wheel 45 moves like a link-block in a groove formed in an appendage 46 secured to the frames 2 and 3: in this manner the forces exerted by the various thrust members 40 for rotating the associated housing 14 or 15, are balanced even if the angular position of the housing has changed as a result of the adjustment.

On the basis of the description given hitherto, it is now possible to understand the functioning of the stand 1 with respect to the angular adjustment under load of its crossing rolls 10, 11 and 12, 13.

When it is required to change the inclination of the pairs of above-mentioned rolls, the thrust members 40 are activated; as a result, the housings 14, 15 are caused to rotate about the axis V.

The rotation is assisted by the support action performed by the bearings 30 with respect to the housings 14, 15.

Indeed, it is not difficult to appreciate that the angular movement of the housings 14, 15 is transmitted also to each thrust bearing 32 mounted thereon: each bearing 32 is therefore caused to rotate about the axis A1 of the associated eccentrically superposed thrust bearing 31, the casing 34 thereof does not move because it is secured to one of the frames 2 and 3 of the stand.

In practice, owing to the eccentric mounting of the superposed axial thrust bearings 31 and 32, an articulated quadrilateral is obtained, the connecting rod thereof being represented by each housing 14, 15 and wherein the cranks are defined by the above-mentioned eccentricity.

In order to better understand the dynamics of that angular adjustment, FIG. 3 shows with a broken line the outline of the bearings 30, highlighting the above-mentioned eccentricity together with the inclination of the housing 14.

As a consequence of the adjustment just described, each housing 14 and 15 undergoes a rotation about the vertical axis V, combined with a translation in a plane perpendicular thereto (that is to say, the plane of FIG. 3); the extent of these two movements depends on the eccentricity between the upper 31 and lower 32 thrust bearings.

It should however be specified that the rotation of the housings necessary in order to effect the angular adjustment of the crossing rolls is of the order of ±1°–2° and therefore their above-mentioned translation is fairly small.

Referring back to the preliminary statement made above, it will now be understood why in the rolling stand 1, the vertical axis V passing through the point of intersection, in plan view, of the axes of the crossing rolls 10, 11 and 12, 13, is not fixed with respect to the load-bearing structure of the stand but undergoes slight translations as a function of the angular adjustment of the rolls. The translations are in fact connected with those just explained which are undergone by the rolls together with the associated housings.

It will therefore be appreciated from the above description that, owing to the bearings 30 of this invention, the aim set in the introduction is fully achieved.

First of all, it should be pointed out that the bearings can be readily obtained by using normal circular rolling-contact thrust bearings, so that it is not necessary to have return springs or other complicated systems for correctly repositioning their rolling bodies after the inclination of the crossing rolls has been adjusted, unlike the situation in U.S. Pat. No. 5,320,434.

Secondly, it should be mentioned that the rolling-contact bearings used here can be selected from commercially available bearings, with all the evident advantages; this result is made possible by the fact that industrial bearings are nowadays available with such performances as to cope even with the high axial forces discussed above.

Moreover, it should mainly be emphasised that the bearings of the invention can also be used in stands having various dimensions.

In other words, owing to their structure and mode of functioning, the bearings are not affected by their positioning with respect to the vertical axis about which the crossing rolls of the stand are orientated, in order to adjust the angular position thereof: consequently, the bearings of this invention are compatible with rolls (and stands) having different dimensions.

More generally, it may be stated that the intrinsic features of the bearings of the invention enable them to be used in any kind of rolling stand: that is to say, neither the dimensional diversity nor the structural and functional diversity of the stands constitute an obstacle to the application of the invention.

For example, it is not difficult to imagine an advantageous application of the above-described bearings in rolling stands of the type considered in U.S. Pat. No. 4,453,393, which has been referred to several times, by interposing them between the actuators (shown as electromechanical devices 11 having screws 4) and the surface on which they act.

Similarly, it would be possible to use the bearings of the invention also in a context such as that described in the British patent application published under U.S. Pat. No. 2,141,959, in the name of Davy McKee.

The latter document shows diagrammatically a rolling stand which does not have actuators operating vertically on the crossing rolls and wherein there are no roll-carrying housings but the chocks of the backup rolls are in abutment with the frames of the load-bearing structure of the stand.

Between the above-mentioned chocks and frames there are means for reducing the sliding friction in order to permit the angular adjustment of the rolls under load: it will be appreciated that it would be possible to use the bearings of the present invention instead of those means.

It also follows as a logical corollary from these observations that the bearings of the invention could be applied also in rolling stands where the working rolls and the backup rolls are not accommodated in special housings, as in this case, but are instead mounted in the stand structure with their chocks in a stack and the (hydraulic or electromechanical) adjusting actuators act directly on those stacked chocks.

It is then quite clear that the principles of the invention are valid also in the case of rolling stands wherein only one of the working rolls (that is to say, only that at the top or that at the bottom) is angularly adjustable; likewise, it is equally clear that the invention can be applied not only in the case of pair crossing but also in rolling stands without backup rolls or in rolling stands having two or more backup rolls for each working roll.

Naturally, other embodiments of the invention with respect to the example thereof which has been given heretofore are not to be excluded.

Indeed, considering the support 33 of the bearings 30, it may be mentioned that it permits the superposed mounting of two commercial thrust bearings 31, 32: in other words, the support 33 acts in practice as an adapting element between those two bearings.

However, as an alternative embodiment to such a solution, it is possible to provide a special bearing wherein the support 33 is instead formed in one piece with the bearing blocks of the lower and upper rolling-contact thrust bearings 31 and 32, which are adjacent to the support 33.

Moreover, the thrust bearings could differ from those shown in the drawings; for example, they might have rolling bodies arranged on two or more series of coaxial circles: such a solution would in fact appear to be favourable in view of the substantial forces which the bearings have to withstand.

In the same way, it is then not necessary for the rolling bodies to be conical rolls, but, for example, balls or cylindrical rolls could also be used; in the case of thrust bearings having several series of rolling bodies, it is possible to have a combination of the various shapes (conical, cylindrical, spherical) of these bodies.

In the light of the teaching following from what has been described hitherto, it is clear that it would also be possible to provide for more complicated embodiments of the bearings, such as, for example, those obtainable by arranging three or more rolling-contact thrust bearings one above the other.

In addition, as regards the mode of application of the bearings in the rolling stands, modifications with respect to what has been stated above are possible.

Figure 5:
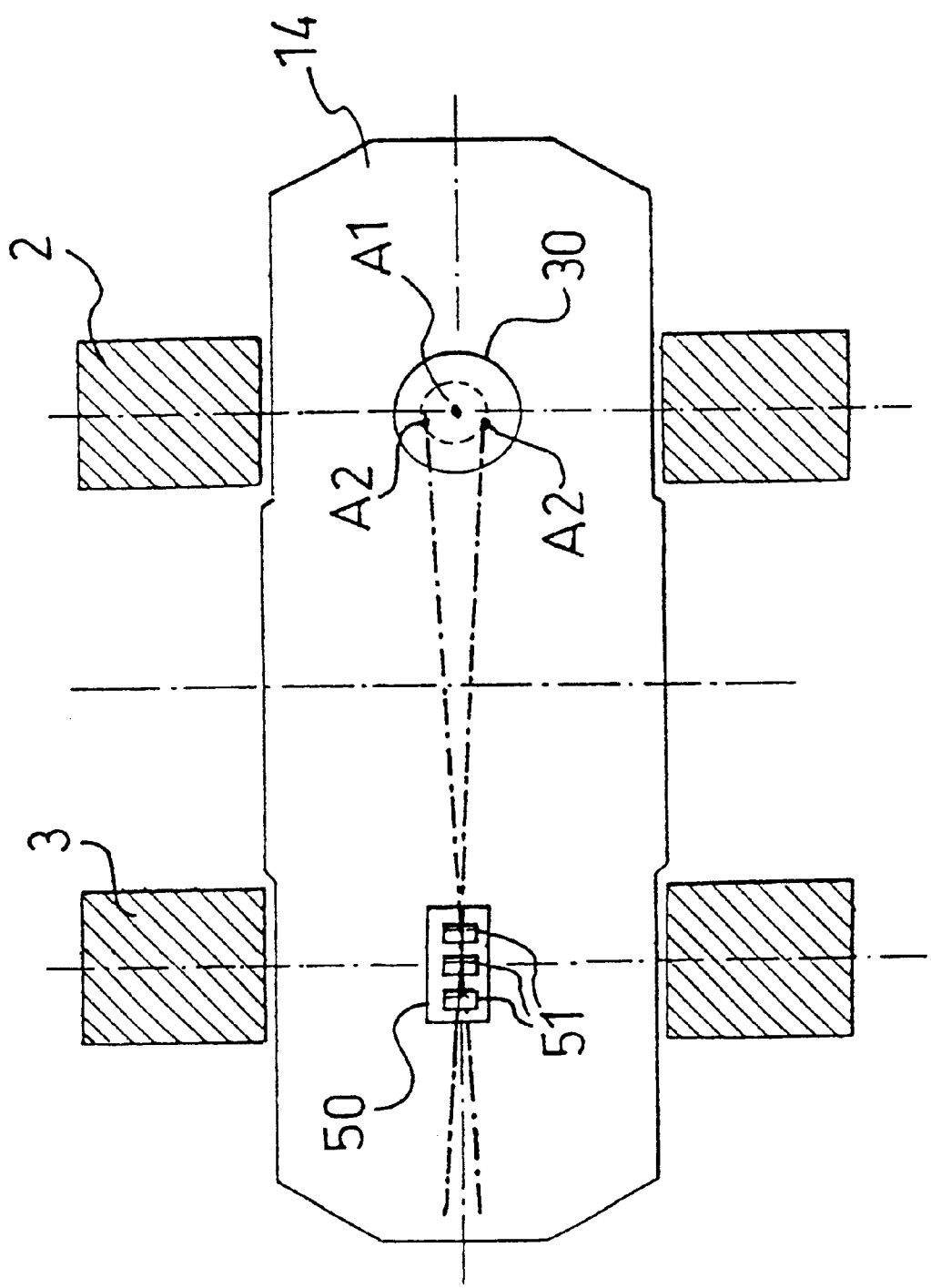
FIG. 5 shows diagrammatically a first variant of the rolling stand of the previous Figures.

A first possibility is shown diagrammatically in FIG. 5, which shows a simplified and partially sectional top view of a rolling stand similar to that previously described, from which it differs only by the use of a-single bearing 30 for each housing 14 and 15.

In this example, instead of the second bearing 30, a sliding skid 50 on which rolling bodies (rolls or balls) are arranged in order to have rolling friction between it and the frame 3 of the stand is mounted on the housing 14 (or 15 as the case may be).

Such a solution in practice reproduces the design of the typical rod-crank mechanism which, as is known, is also a degenerate case of articulated quadrilateral.

In other words, in such a case when the housing 14 is rotated by the thrust members 40, the bearing 30 operates as in the former example while the sliding skid 50 behaves like the small end of the connecting rod in a connecting rod-crank system and therefore it performs reciprocating movements in order to assist the rotations of the axis A2 which is eccentric relative to A1; FIG. 5 shows the angles of rotation of the housing 14 in connection with two positions of the axis A2.

Naturally, this example also could be improved, for instance, by superposing the sliding skid 50 above a thrust bearing of the type considered before; such an alternative could prove useful in a case where the rolling bodies 51 are cylindrical rolls.

Figure 6:
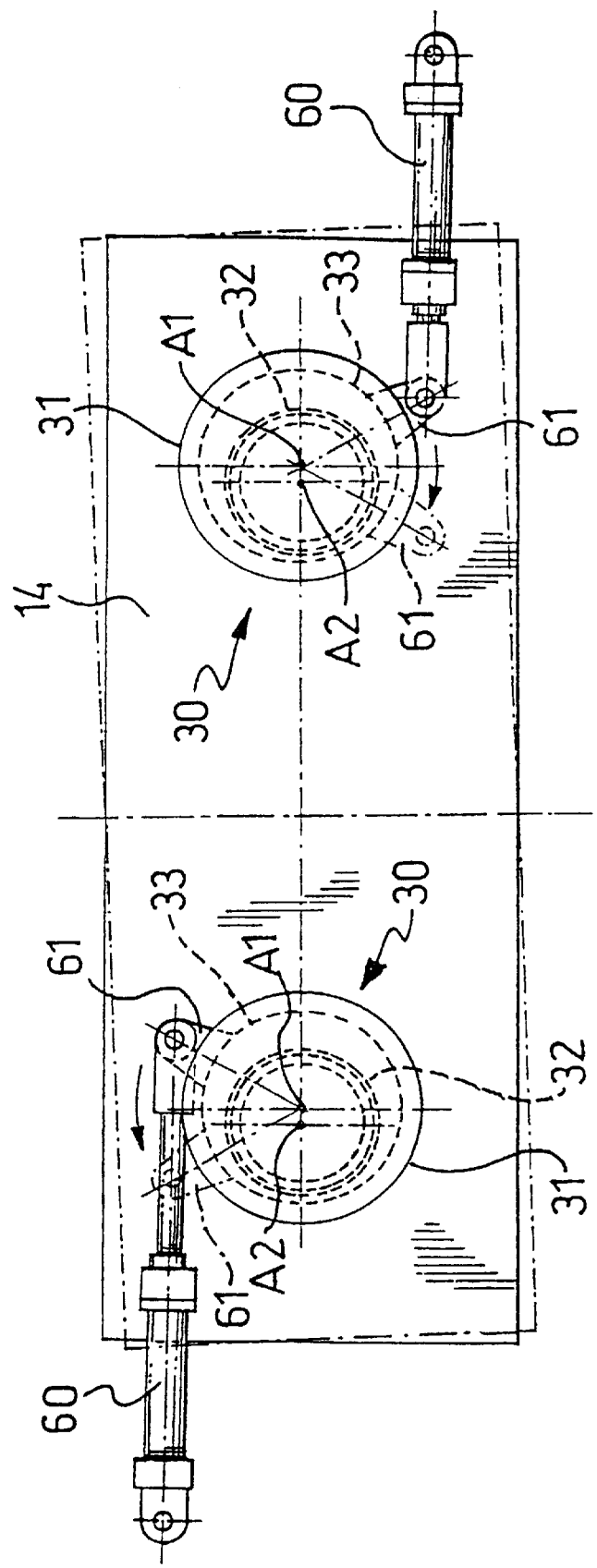
FIG. 6 shows a second variant of the rolling stand.

Referring to FIG. 6, finally, another embodiment of the rolling stand 1 referred to above may be considered.

This Figure shows a top view of the embodiment (where a portion of the stand has been removed for the sake of clarity and where numerals that are the same as those already seen indicate the corresponding elements) which differs from the first one because that each housing 14, 15 is caused to rotate about the vertical axis V, by means of two hydraulic cylinders 60 which are connected to respective arms 61 projecting from the support 33 of each bearing 30, radially with respect to the axis A1.

In other words, in this embodiment the thrust members 40 have been eliminated and replaced by the hydraulic cylinders 60 which apply a force to the corresponding arm 61, thereby causing rotation of the associated support 33 about the axis A1 (referring here to FIG. 4) and then also of the lower thrust bearing 32 which is unitary therewith.

It will be readily appreciated that the eccentricity between the axes A1 and A2 enables again to achieve a combined movement of rotation of the housing 14 (or 15) about the axis V and of translation transverse to that axis, in accordance with the explanation already given above (in FIG. 6, the broken line indicates the positions of the arms 61 and of the housing 14, following the above-mentioned rotation).

All the embodiments above and other possible ones, however, fall within the scope of the claims which follow.

What is claimed is:

1. A bearing for a rolling stand with crossing rolls, comprising:
   a first and a second rolling-contact thrust bearing eccentrically superposed one upon the other,
   wherein said first and second thrust bearings are separate from each other and are mounted on opposite sides of a support.

2. A bearing according to claim 1,
   wherein the first bearing is mounted on an upper side of said support and is removably secured thereto with fastening means, and
   wherein the second bearing is mounted on a lower side of said support and is arranged in a casing removably secured at a top of said second bearing to the support with fastening means.

3. A rolling stand comprising:
   a load-bearing structure,
   an upper working roll and a lower working roll arranged one upon the other in the load-bearing structure, at least one of said working rolls being angularly orientable relative to a vertical reference direction passing through a rotation axis of the same at least one of said working rolls, and
   means for adjusting the angular position of said angularly orientable working roll about the vertical direction,
   wherein said adjusting means comprises a first and a second eccentric bearing respectively arranged where the rolling forces are transmitted by the orientable working roll to the load-bearing structure,
   wherein each of said first and second eccentric bearings includes a first and a second thrust bearing eccentrically superposed one upon the other, so that said first and second eccentric bearings form an articulated quadrilateral which allows movement of the orientable working roll.

4. A rolling stand according to claim 3, wherein said at least one angularly orientable working roll is coupled with one or more backup rolls.

5. A rolling stand according to 4, further comprising two actuators which adjust the distance between said at least one angularly orientable working roll and the opposite working roll, that operate along associated straight lines located on opposite sides with reference to the vertical reference direction, each on a respective eccentric bearing.

6. A rolling stand according to claim 5, wherein the means for adjusting the angular position of said at least one angularly orientable working roll comprise thrust members which act in planes transverse to the vertical reference direction.

7. A rolling stand according to claim 5, wherein the means for adjusting the angular position of said at least one angularly orientable working roll comprise a mechanism which acts on each thrust bearing which is eccentric relative to the other thrust bearing, in order to cause it to rotate about an axis associated with said other thrust bearing.

8. A rolling stand according to claim 5, wherein the angularly orientable working roll and said one or more backup rolls coupled thereto are accommodated in a housing supported in the load-bearing structure in such a manner as to be rotatable about the vertical reference direction, and
   wherein the actuators are also accommodated in the housing.

9. A rolling stand according to claim 4, wherein the angularly orientable working roll and said one or more backup rolls coupled thereto are accommodated in a housing supported in the load-bearing structure in such a manner as to be rotatable about the vertical reference direction.

10. A rolling stand according to claim 3, wherein the first and second thrust bearings are separate from one another and are mounted on opposite sides of a support.

11. A rolling stand comprising:

a load-bearing structure, an upper working roll and a lower working roll arranged one upon the other in the load-bearing structure, at least one of said working rolls being angularly orientable relative to a vertical reference direction passing through the rotation axis of the angularly orientable working roll, and means for adjusting the angular position of said angularly orientable working roll about the vertical direction, wherein said adjusting means comprises an eccentric bearing and a rolling-contact sliding skid respectively arranged where the rolling forces are transmitted by the angularly orientable working roll to the load-bearing structure, and wherein the eccentric bearing includes a first and a second thrust bearing superposed one upon the other, so that the eccentric bearing and the sliding skid form a cinematic system which allows movement of the orientable working roll.

12. A rolling stand according to claim 11, wherein the first and second thrust bearings are separate from one another and are mounted on opposite sides of a support.

* * * * *